United States Patent
Assa et al.

(10) Patent No.: US 11,613,208 B2
(45) Date of Patent: Mar. 28, 2023

(54) TRAILER HITCHING ASSIST SYSTEM WITH TRAILER COUPLER DETECTION

(71) Applicant: Magna Electronics Inc., Auburn Hills, MI (US)

(72) Inventors: Akbar Assa, Richmond Hill (CA); Shweta Suresh Daga, Maharashtra (IN); Brijendra Kumar Bharti, Brampton (CA); Guruprasad Mani Iyer Shankaranarayanan, Mississauga (CA); Jyothi P. Gali, Rochester Hills, MI (US); Anoop S. Mann, Brampton (CA); Alexander Velichko, Toronto (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 483 days.

(21) Appl. No.: 16/947,379

(22) Filed: Jul. 30, 2020

(65) Prior Publication Data

US 2021/0034902 A1 Feb. 4, 2021

Related U.S. Application Data (60) Provisional application No. 62/880,194, filed on Jul. 30, 2019.

(51) Int. Cl.
*G06K 9/20* (2006.01)
*G06K 9/00* (2022.01)
(Continued)

(52) U.S. Cl.
CPC ............ *B60R 1/00* (2013.01); *G06F 18/2155* (2023.01); *G06F 18/2411* (2023.01);
(Continued)

(58) Field of Classification Search
CPC ... B60R 1/00; B60R 2300/10; B60R 2300/20; B60R 2300/607; B60R 2300/802;
(Continued)

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Sath V Perungavoor
*Assistant Examiner* — Tyler B Edwards
(74) *Attorney, Agent, or Firm* — Honigman LLP (57) ABSTRACT

A trailering assist system for a vehicle includes a camera disposed at a rear portion of a vehicle and having a field of view rearward of the vehicle, the field of view encompassing at least a portion of a trailer rearward of the vehicle. The camera captures image data, which is representative of at least a front profile of the trailer, which includes a trailer coupler of the trailer. An ECU includes an image processor that processes image data captured by the camera. The ECU, responsive to image processing of captured image data, determines a location of the front profile of the trailer relative to the vehicle. Responsive to determining the location of the front profile, the ECU determines a plurality of outline landmarks that represent a shape of the front profile of the trailer. Based on the determined outline landmarks, the ECU determines a location of the trailer coupler.

20 Claims, 4 Drawing Sheets

(51) Int. Cl.
    *G06K 9/62*        (2022.01)
    *G06K 9/46*        (2006.01)
    *B60R 1/00*        (2022.01)
    *G06V 20/56*       (2022.01)
    *G06F 18/214*      (2023.01)
    *G06F 18/2411*     (2023.01)

(52) U.S. Cl.
    CPC .......... *G06V 20/56* (2022.01); *B60R 2300/10* (2013.01); *B60R 2300/20* (2013.01); *B60R 2300/607* (2013.01); *B60R 2300/802* (2013.01); *B60R 2300/808* (2013.01); *B60R 2300/8086* (2013.01)

(58) Field of Classification Search
    CPC ....... B60R 2300/808; B60R 2300/8086; G06F 18/2155; G06F 18/2411; G06V 20/56
    See application file for complete search history.

(56) References Cited

U.S. PATENT DOCUMENTS

| | | | |
|---|---|---|---|
| 5,949,331 | A | 9/1999 | Schofield et al. |
| 6,498,620 | B2 | 12/2002 | Schofield et al. |
| 6,690,268 | B2 | 2/2004 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 9,085,261 | B2 | 7/2015 | Lu et al. |
| 9,264,672 | B2 | 2/2016 | Lynam |
| 9,446,713 | B2 | 9/2016 | Lu et al. |
| 9,558,409 | B2 | 1/2017 | Pliefke et al. |
| 10,071,687 | B2 | 9/2018 | Ihlenburg et al. |
| 10,086,870 | B2 | 10/2018 | Gieseke et al. |
| 10,099,614 | B2 | 10/2018 | Diessner |
| 10,160,382 | B2 | 12/2018 | Pliefke et al. |
| 10,532,698 | B2 | 1/2020 | Potnis et al. |
| 10,552,976 | B2 | 2/2020 | Diessner et al. |
| 10,586,119 | B2 | 3/2020 | Pliefke et al. |
| 10,638,025 | B2 | 4/2020 | Gali et al. |
| 10,706,291 | B2 | 7/2020 | Diessner et al. |
| 10,733,757 | B2 | 8/2020 | Gupta et al. |
| 10,755,110 | B2 | 8/2020 | Bajpai |
| 11,417,116 | B2 | 8/2022 | Joseph et al. |
| 2014/0063197 | A1 | 3/2014 | Yamamoto et al. |
| 2014/0085472 | A1 | 3/2014 | Lu et al. |
| 2014/0160276 | A1 | 6/2014 | Pliefke et al. |
| 2014/0267688 | A1 | 9/2014 | Aich et al. |
| 2015/0002670 | A1 | 1/2015 | Bajpai |
| 2015/0217693 | A1 | 8/2015 | Pliefke et al. |
| 2016/0049020 | A1 | 2/2016 | Kuehnle et al. |
| 2017/0050672 | A1 | 2/2017 | Gieseke et al. |
| 2017/0174128 | A1* | 6/2017 | Hu ........................... G06T 7/74 |
| 2017/0217372 | A1 | 8/2017 | Lu et al. |
| 2017/0254873 | A1 | 9/2017 | Koravadi |
| 2017/0280091 | A1 | 9/2017 | Greenwood et al. |
| 2017/0341583 | A1 | 11/2017 | Zhang et al. |
| 2018/0211528 | A1 | 7/2018 | Seifert |
| 2018/0215382 | A1 | 8/2018 | Gupta et al. |
| 2018/0253608 | A1 | 9/2018 | Diessner et al. |
| 2018/0276838 | A1 | 9/2018 | Gupta et al. |
| 2018/0276839 | A1 | 9/2018 | Diessner et al. |
| 2018/0361929 | A1* | 12/2018 | Zhang ..................... B60R 1/003 |
| 2019/0016264 | A1 | 1/2019 | Potnis et al. |
| 2019/0039649 | A1 | 2/2019 | Gieseke et al. |
| 2019/0042864 | A1 | 2/2019 | Pliefke et al. |
| 2019/0064831 | A1 | 2/2019 | Gali et al. |
| 2019/0118860 | A1 | 4/2019 | Gali et al. |
| 2019/0143895 | A1 | 5/2019 | Pliefke et al. |
| 2019/0241126 | A1 | 8/2019 | Murad et al. |
| 2019/0275941 | A1 | 9/2019 | Lu et al. |
| 2019/0297233 | A1 | 9/2019 | Gali et al. |
| 2019/0329821 | A1 | 10/2019 | Ziebart et al. |
| 2019/0347498 | A1 | 11/2019 | Herman et al. |
| 2019/0347825 | A1 | 11/2019 | Gupta et al. |
| 2020/0017143 | A1 | 1/2020 | Gali |
| 2020/0334475 | A1 | 10/2020 | Joseph et al. |
| 2020/0356788 | A1 | 11/2020 | Joseph et al. |
| 2020/0361397 | A1 | 11/2020 | Joseph et al. |
| 2020/0406967 | A1 | 12/2020 | Yunus et al. |
| 2021/0023997 | A1 | 1/2021 | Vasoya |
| 2021/0078634 | A1 | 3/2021 | Jalalmaab et al. |
| 2021/0094473 | A1 | 4/2021 | Gali et al. |
| 2021/0170820 | A1 | 6/2021 | Zhang |
| 2021/0170947 | A1 | 6/2021 | Yunus et al. |

* cited by examiner

TRAILER HITCHING ASSIST SYSTEM WITH TRAILER COUPLER DETECTION

CROSS REFERENCE TO RELATED APPLICATION

The present application claims priority of U.S. provisional application Ser. No. 62/880,194, filed Jul. 30, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Trailer assist systems are known that may determine an angle of a trailer hitched at a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a driver assistance system or vision system or imaging system for a vehicle that utilizes an image sensor such as a camera disposed at a rear portion of the vehicle and having a field of view exterior of and at least rearward of the vehicle and encompassing at least a portion of a trailer coupler of a trailer stationary a distance from the vehicle. The control comprises circuitry that includes an image processor operable to process image data captured by the camera that is representative of at least the front face or front profile of the trailer. The control, responsive to image processing by the image processor at the control of image data captured by the camera, determines a location of the front profile of the trailer and determines a plurality of landmarks corresponding to the location of the front profile. Responsive to determining the plurality of landmarks, the control determines a location of the trailer coupler.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and of a trailer being or to be towed by the vehicle and may process the captured image data to determine a path of travel for the vehicle and trailer or the vehicle toward the trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more sensors (e.g., cameras) and that may provide an output to a display device for displaying images representative of the captured image data. Optionally, the system may provide a display, such as a rearview display or a top down or bird's eye or surround view display or the like.

Figure 1:
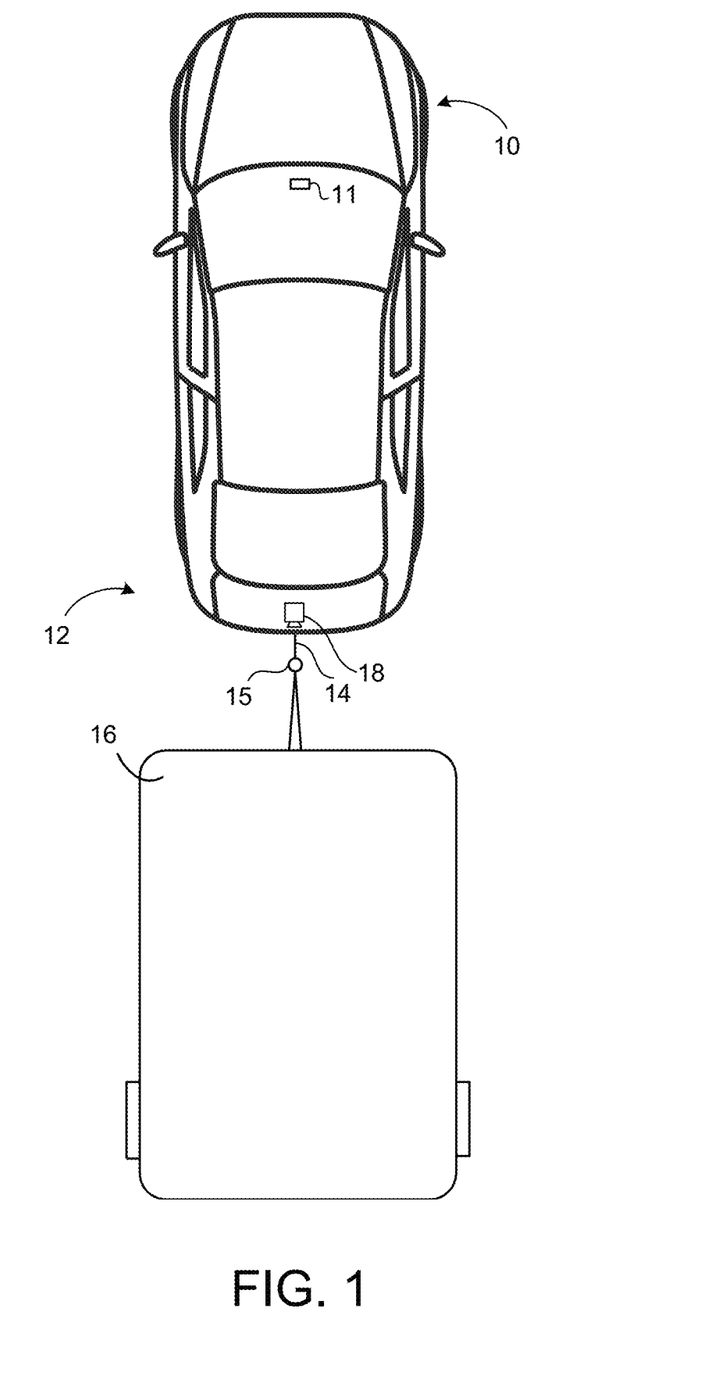
FIG. 1 is a plan view of a vehicle with a trailer assist system for use in hitching a trailer at the vehicle and/or controlling the vehicle and trailer.

Referring now to the drawings and the illustrative embodiments depicted therein, a vehicle 10 includes a vehicle and trailer maneuvering system or maneuver assist system and/or driving assist system or trailer hitching system 12 that is operable to assist in backing up or reversing the vehicle with a hitched trailer that is hitched at the rear of the vehicle via a hitch 14 or operable to assist in backing up or reversing the vehicle toward a trailer to be hitched, and the system may maneuver the vehicle 10 (and optionally the trailer 16) toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior and rearward of the vehicle 10, with the field of view of the camera encompassing the hitch 14 and/or trailer 16 and/or trailer coupler 15, and with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control 11 or electronic control unit (ECU) having a processor that is operable to process image data captured by the camera or cameras and that may detect objects or the like and/or provide displayed images (or other visual indication) at a display device for viewing by the driver of the vehicle (the control and/or display device may be part of or incorporated in or at an interior rearview mirror assembly of the vehicle, or the control and/or the display device may be disposed elsewhere at or in the vehicle) a representation of the captured image data. The data transfer or signal communication from the camera 18 to the ECU may comprise any suitable data or communication link (wired and/or wireless), such as a vehicle network bus or the like of the equipped vehicle.

Figure 2A:
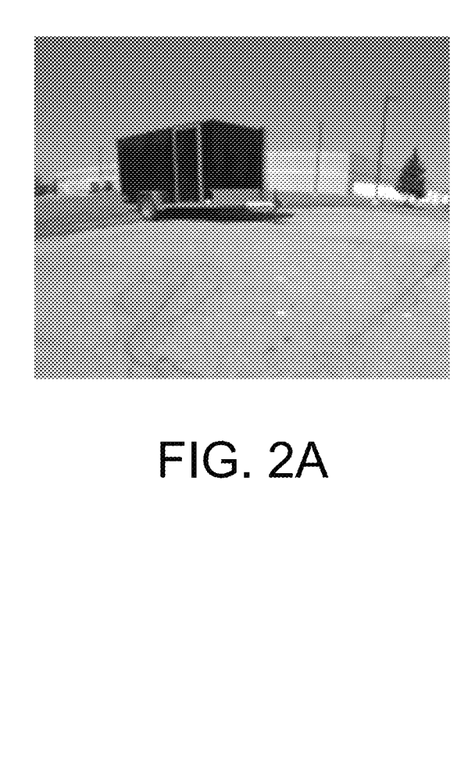
FIGS. 2A-C are perspective views of a trailer in different orientations relative to a vehicle.
Figure 2B:
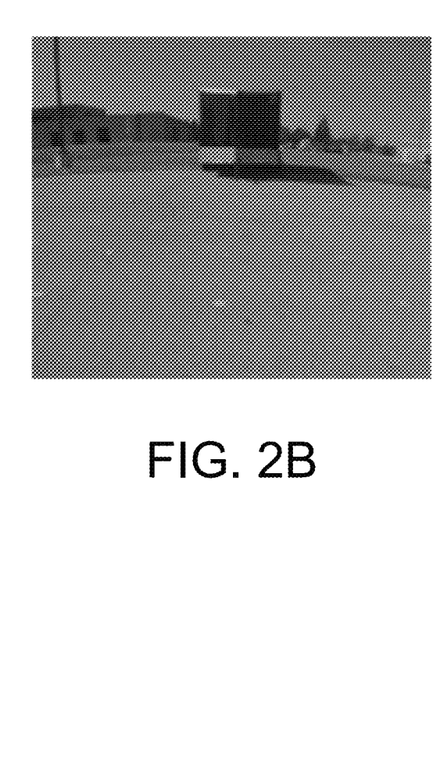
Figure 2C:
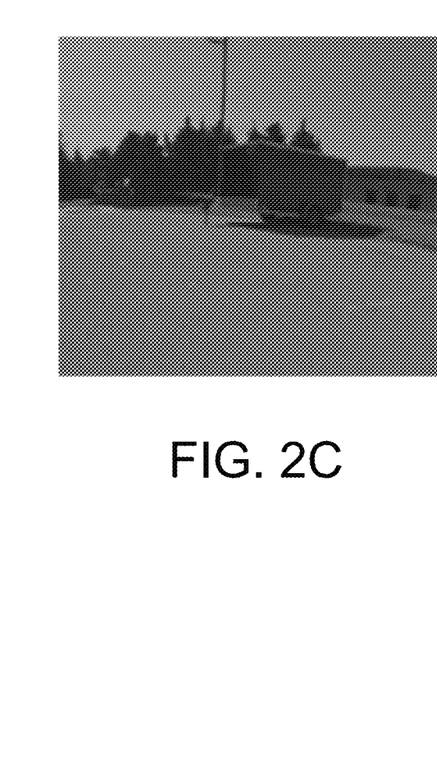

When connecting or hitching a trailer to a vehicle, the driver is typically required to manually reverse the vehicle toward a trailer coupler of a trailer. However, even with the assistance of rearward facing or rearward viewing cameras (e.g., "backup" cameras), the task may still be arduous and largely dependent on the experience and skill of the driver. While some backup cameras include a guideline overlay, there is no guarantee that the hitch will be aligned with the trailer coupler. Thus, it is advantageous to automate the process of hitch and coupler alignment. However, the automation requires accurate localization of the trailer's coupler 15 using the rear view camera. When the vehicle is distant from the trailer (e.g., multiple meters), the coupler 15 may not be clearly visible and/or detectable from the image data of the rear view camera. That is, the when the trailer is further than a threshold distance from the vehicle, the resolution of the camera may be insufficient to accurately identify the trailer coupler 15. A trailer localization system and method of the present invention determines the location of the coupler 15 using a geometry or posture of the trailer (FIGS. 2A-C) even when the trailer is sufficiently distanced from the vehicle to determine the location of the coupler 15 using traditional techniques. The system or method determines a front face or front profile of the trailer and approximates or estimates or determines the structure of the front face or profile of the trailer, which allows the system to locate the coupler 15 even when the vehicle is approaching the trailer from a wide angle (e.g., ±60 degrees between a centerline of the trailer and a centerline of the vehicle).

The trailer or coupler localization system is broken into three steps, each of which is discussed in more detail below. In the first step, the system determines a location of the trailer from image data captured by the rear facing camera. This includes identifying or determining the parameters of a bounding box in which the trailer exists. During the second step, the system extracts and saves landmarks of the front side of the trailer as the system assumes that the front side of the trailer includes the location of the trailer coupler 15. In the third step, the first two steps are repeated for consecutive frames of captured image data to further increase accuracy.

To determine or detect the location of the trailer, the system may use one or more classifiers. Image data captured by the camera(s) may be split into one or more sections or patches and the control may process or evaluate the patches one at a time and determine if a trailer is present in each patch. The control may sweep or process each patch at multiple different scales (i.e., upscaled and downscaled image data). In some implementations, the system uses a two-step classifier. For example, the first stage of the classifier may include a linear Support Vector Machine (SVM) that filters out the majority (e.g., 99 percent) of negative patches (i.e., patches that do not include a trailer). The SVM is efficient and quickly processes the patches, which allows the control to quickly sweep the entire frame of captured image data.

Any patches that are not negative (i.e., the SVM determined a trailer may be present) are passed to a second stage of the classifier. In some examples, the second stage includes a nonlinear SVM. The nonlinear SVM accurately filters out the patches that the linear SVM designated as potentially including a trailer (false positives). Due to the increased processing time of the nonlinear SVM, limiting processing to only the patches passed by the linear SVM substantially reduces overall processing time and increases the efficiency of the system. The nonlinear SVM (i.e., the trailer detection stage) outputs a bounding box that highlights the location of the trailer in the frame of captured image data. Thus, the system may process the image data in two steps, with a first step that is less-computationally intensive to eliminate areas that the system determines with a high degree of confidence do not include the trailer. Then, during a second step, the system may apply different or more thorough processing or more computationally intensive processing to the remaining areas, thus reducing the amount of resources needed to process the entire frame of image data.

Figure 3:
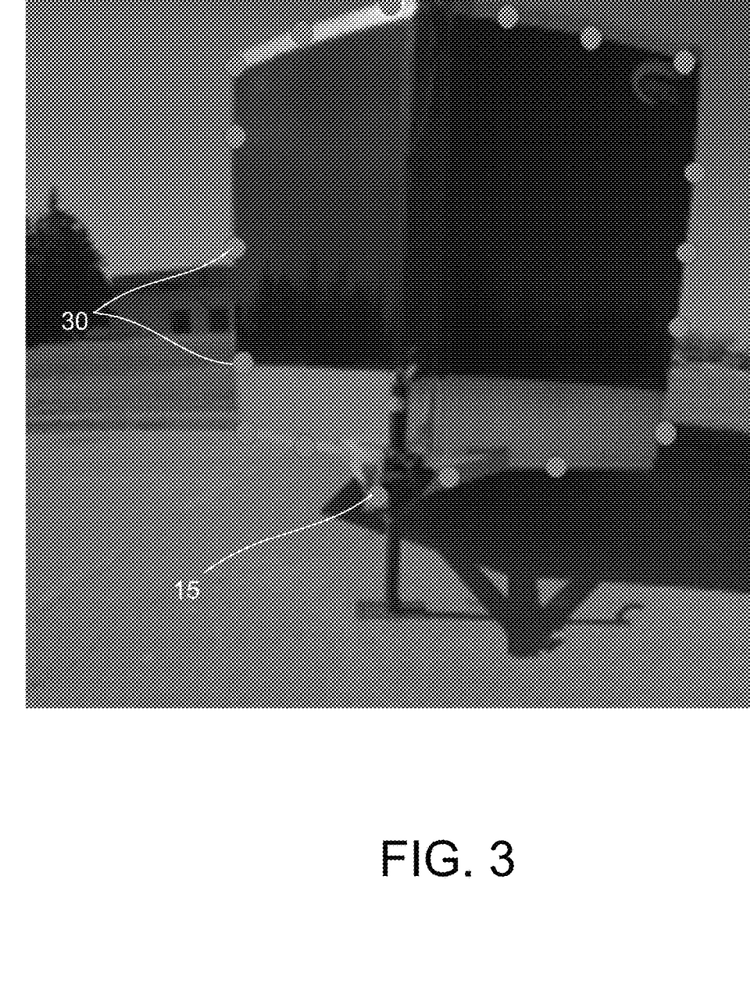
FIG. 3 is a perspective view of a box trailer annotated with landmark points.

Referring now to FIG. 3, an ensemble of regression trees may be used to detect the landmarks 30 of the trailer. Locations of landmarks for a respective trailer is dependent upon a shape of the trailer. However, regardless of the shape, one of the landmarks is typically the coupler point. Prior to detection, the decision trees may be trained using annotated data. For example, the annotation data includes annotating landmark points in each image of a data set (e.g., a set of image data captured by the rear viewing camera that includes the trailer and trailer coupler point). For example, each landmark 30 point may be labeled with an x-coordinate and a y-coordinate pixel position. The landmark points may be chosen or selected or detected from the coupler region which may determine the shape of the front face or front profile of the trailer. In some implementations, one of the landmark points is the coupler point itself. The trained model may then be used on images within the trailer's bounding box (acquired from the previous trailer detection) to locate the landmarks of the trailer. The landmark corresponding to the coupler point of the trailer is then saved.

The trailer detection and landmark determination or estimation, in some implementations, is performed for a number of consecutive frames (e.g., five frames) to increase the accuracy of the coupler point determination. The number of frames may be limited, as the location of the coupler point moves (in the captured image data) as the vehicle moves (i.e., reverses towards the trailer) and accuracy gains diminish. In some implementations, an unsupervised learning method (e.g., mixture models, K-Means, etc.) is used to generate a single point as the coupler's location in the camera image. However, other types of learning may also be used (e.g., reinforcement learning, supervised learning, etc.) The determined trailer coupler 15 may be provided in image coordinates (i.e., an x coordinate and a y coordinate pixel position) and known algorithms may be practiced to determine the three dimensional location of the coupler 15 from frames of image data captured by the camera/(e.g., Structure from Motion).

Figure 4:
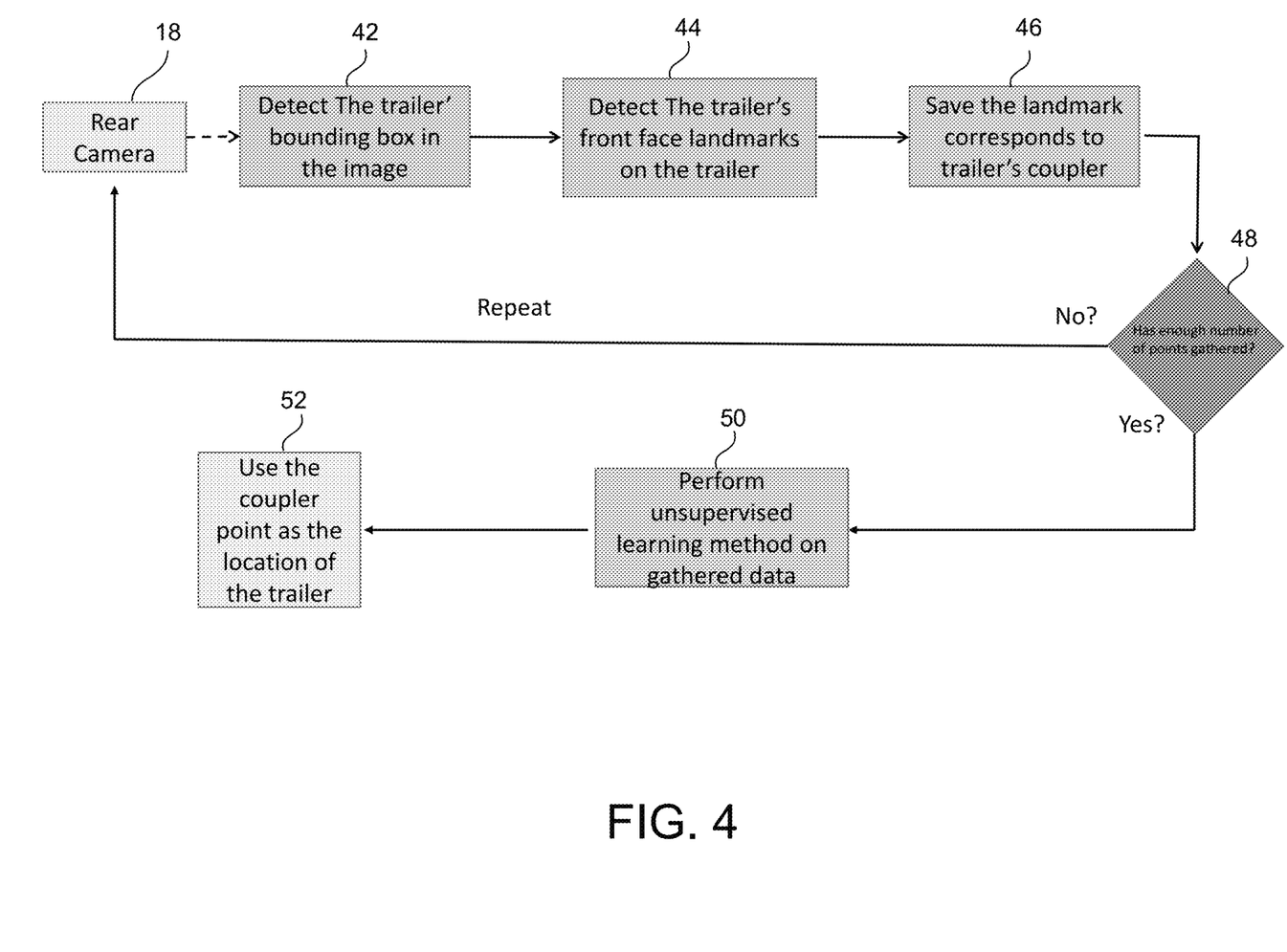
FIG. 4 is a block diagram of the trailer hitching assist system.

Referring now to FIG. 4, a block diagram of the trailer or coupler localization system is illustrated. The rear facing image sensor (e.g., the camera 18) captures image data that includes at least a portion of the trailer stationary a distance from the vehicle. The control, at 42, detects the trailer's bounding box in a frame of the captured image data (i.e., the control determines an area that includes the trailer, such as by determining the front face or front profile of the trailer). In order to increase efficiency and reduce processing time, the bounding box may, for example, highlight an area for further processing, which may reduce overall processing by allowing the control to focus on a particular area (i.e., regions of interest) of the image instead of the entire image. The control then detects or determines or estimates the landmarks of the trailer's front face (e.g., points along an outline or perimeter of the trailer's front face or profile, which is at or within the bounding box) and determines and saves the landmark that corresponds to the trailer's coupler point at 46. At 48, the control determines if enough trailer coupler points have been gathered. That is, the control determines a number of frames of image data the control has determined the location of the trailer coupler. When the number of frames fails to exceed a threshold, the operations 42, 44, 46 are repeated. When enough trailer coupler points have been gathered (i.e., the threshold is exceeded), the control performs an unsupervised learning method on the gathered data at 50 to determine a final coupler location and uses the final coupler location as the location of the trailer at 52.

Thus, the system of the present invention provides the ability to automatically align the vehicle's hitch with the trailer coupler from a distance of several meters (e.g., eight meters) and at various orientations with respect to the vehicle (e.g., when the trailer is at an angle, for example, up to 60 degrees, with respect to the vehicle). The system accurately determines the location of the coupler point by determining the geometry of the trail from only images captured by a rear facing camera. This allows the system to determine the coupler at far distances when otherwise the coupler is not detectable via traditional methods. The system may also be used for trailer angle estimation and may use motion of the vehicle to redetect the coupler point in consecutive images making it robust to image noise.

The system may utilize aspects of the trailering assist systems or trailer angle detection systems or trailer hitch assist systems described in U.S. Pat. Nos. 10,638,025; 9,085,261 and/or 6,690,268, and/or U.S. Publication Nos. US-2020-0017143; US-2019-0347825; US-2019-0275941; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, and/or U.S. patent application Ser. No. 16/946,542, filed on Jun. 26, 2020, Ser. No. 15/929,535, filed on May 8, 2020, and/or Ser. No. 16/850, 300, filed on Apr. 16, 2020 , and/or U.S. provisional application Ser. No. 62/883,202, filed Aug. 6, 2019, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:

a camera disposed at a rear portion of a vehicle equipped with the vehicular trailering assist system, the camera having a field of view at least rearward of the vehicle, the camera viewing at least a portion of a trailer that is spaced from the vehicle at a distance from the vehicle;

wherein the camera captures image data, and wherein the image data captured by the camera is representative of at least a front profile of the trailer, the front profile of the trailer comprising a trailer coupler of the trailer;

an electronic control unit (ECU) comprising electronic circuitry and associated software;

wherein the electronic circuitry comprises an image processor operable to process image data captured by the camera;

wherein the ECU, responsive to image processing at the ECU of image data captured by the camera, determines a location of the front profile of the trailer relative to the vehicle;

wherein, responsive to determining the location of the front profile of the trailer relative to the vehicle, the ECU determines a plurality of outline landmarks corresponding to an outline of the front profile of the trailer, and wherein the plurality of outline landmarks are representative of a shape of the front profile of the trailer; and wherein, based at least in part on the determined plurality of outline landmarks, the ECU determines a location of the trailer coupler.

2. The vehicular trailering assist system of claim 1, wherein the ECU determines the location of the front profile of the trailer using a two-stage classifier.

3. The vehicular trailering assist system of claim 2, wherein a first stage of the two-stage classifier comprises a linear Support Vector Machine and a second stage of the two-stage classifier comprises a nonlinear Support Vector Machine.

4. The vehicular trailering assist system of claim 1, wherein, the ECU generates a bounding box that estimates the location of the front profile of the trailer for further processing.

5. The vehicular trailering assist system of claim 1, wherein the ECU determines the plurality of outline landmarks using a detector model, and wherein the detector model is based on an ensemble of regression trees.

6. The vehicular trailering assist system of claim 5, wherein the detector model is trained on annotated image data, the annotated image data comprising outline landmarks.

7. The vehicular trailering assist system of claim 1, wherein the ECU repeats determination of the location of the front profile of the trailer and the plurality of outline landmarks via processing at the ECU of consecutive frames of image data captured by the camera.

8. The vehicular trailering assist system of claim 7, wherein the ECU repeats determination of the location of the front profile of the trailer and the plurality of outline landmarks via processing at the ECU of five consecutive frames of image data captured by the camera.

9. The vehicular trailering assist system of claim 1, wherein the ECU, responsive to determining the plurality of outline landmarks, determines the location of the trailer coupler using an unsupervised learning method.

10. The vehicular trailering assist system of claim 9, wherein the unsupervised learning method comprises a mixture model or a K-Means method.

11. The vehicular trailering assist system of claim 1, wherein, responsive to detecting the location of the trailer coupler, the ECU performs a reversing maneuver of the vehicle towards the detected trailer coupler location.

12. The vehicular trailering assist system of claim 1, wherein the location of the trailer coupler is one of the plurality of outline landmarks.

13. The vehicular trailering assist system of claim 1, wherein the ECU, responsive to determining the location of the trailer coupler, displays the location of the trailer coupler on a display device disposed within the interior of the vehicle.

14. A vehicular trailering assist system, the vehicular trailering assist system comprising:

a camera disposed at a rear portion of a vehicle equipped with the vehicular trailering assist system, the camera having a field of view at least rearward of the vehicle, the camera viewing at least a portion of a trailer that is spaced from the vehicle at a distance from the vehicle;

wherein the camera captures image data, and wherein the image data captured by the camera is representative of at least a front profile of the trailer, the front profile of the trailer comprising a trailer coupler of the trailer;

an electronic control unit (ECU) comprising electronic circuitry and associated software;

wherein the electronic circuitry comprises an image processor operable to process image data captured by the camera;

wherein the ECU, responsive to image processing at the ECU of image data captured by the camera, determines a location of the front profile of the trailer relative to the vehicle;

wherein the ECU determines the location of the front profile of the trailer using a two-stage classifier;

wherein, responsive to determining the location of the front profile of the trailer relative to the vehicle, the ECU determines a plurality of outline landmarks corresponding to an outline of the front profile of the trailer, and wherein the plurality of outline landmarks are representative of a shape of the front profile of the trailer;

wherein the ECU determines the plurality of outline landmarks using a detector model, and wherein the detector model is based on an ensemble of regression trees; and wherein, based at least in part on the determined plurality of outline landmarks, the ECU determines a location of the trailer coupler.

15. The vehicular trailering assist system of claim 14, wherein a first stage of the two-stage classifier comprises a linear Support Vector Machine and a second stage of the two-stage classifier comprises a nonlinear Support Vector Machine.

16. The vehicular trailering assist system of claim 14, wherein, responsive to determining the location of the trailer, the ECU generates a bounding box that estimates the location of the front profile of the trailer for further processing.

17. The vehicular trailering assist system of claim 14, wherein the ECU repeats determination of the location of the trailer and the plurality of outline landmarks via processing at the ECU of consecutive frames of image data captured by the camera.

18. A vehicular trailering assist system, the vehicular trailering assist system comprising:

a camera disposed at a rear portion of a vehicle equipped with the vehicular trailering assist system, the camera having a field of view at least rearward of the vehicle, the camera viewing at least a portion of a trailer that is spaced from the vehicle at a distance from the vehicle;

wherein the camera captures image data, and wherein the image data captured by the camera is representative of at least a front profile of the trailer, the front profile of the trailer comprising a trailer coupler of the trailer;

an electronic control unit (ECU) comprising electronic circuitry and associated software;

wherein the electronic circuitry comprises an image processor operable to process image data captured by the camera;

wherein the ECU, responsive to image processing at the ECU of image data captured by the camera, determines a location of the front profile of the trailer relative to the vehicle;

wherein, responsive to determining the location of the front profile of the trailer relative to the vehicle, the ECU determines a plurality of outline landmarks corresponding to an outline of the front profile of the trailer, and wherein the plurality of outline landmarks are representative of a shape of the front profile of the trailer;

wherein the ECU repeats determination of the location of the front profile of the trailer and the plurality of outline landmarks via processing at the ECU of consecutive frames of image data captured by the camera; and wherein, based at least in part on the determined plurality of outline landmarks from the consecutive frames of image data captured by the camera, the ECU determines a location of the trailer coupler using an unsupervised learning method.

19. The vehicular trailering assist system of claim 18, wherein the unsupervised learning method comprises a mixture model or a K-Means method.

20. The vehicular trailering assist system of claim 18, wherein the location of the trailer coupler is one of the plurality of outline landmarks.

* * * * *